United States Patent

Dawson

Patent Number: 5,992,569
Date of Patent: Nov. 30, 1999

[54] BEARING GREASE PACKER

[76] Inventor: Noel Lindsay Dawson, 30 Sydney Road., Mudgee, NSW, 2850, Australia

[21] Appl. No.: 08/793,498
[22] PCT Filed: Aug. 7, 1995
[86] PCT No.: PCT/AU95/00478
 § 371 Date: Jun. 3, 1997
 § 102(e) Date: Jun. 3, 1997
[87] PCT Pub. No.: WO96/05465
 PCT Pub. Date: Feb. 22, 1996

[30] Foreign Application Priority Data

Aug. 8, 1994 [AU] Australia .................................. PM 7342

[51] Int. Cl.⁶ .............................. F16N 11/02; F16C 33/66
[52] U.S. Cl. ............................................... 184/5.1; 184/28
[58] Field of Search .................................. 184/5.1, 105.1, 184/105.2, 28, 38.2; 403/349

[56] References Cited

U.S. PATENT DOCUMENTS

| 3,717,222 | 2/1973 | Moline | 184/1 D |
| 4,168,766 | 9/1979 | Shultz | 184/1 D |
| 4,345,667 | 8/1982 | Shultz | 184/1 D |
| 4,355,702 | 10/1982 | Shultz | 184/1 D |
| 4,405,035 | 9/1983 | Shultz | 184/1 D |
| 4,491,060 | 1/1985 | Boski | 92/128 |
| 5,036,950 | 8/1991 | Clark | 184/7.4 |
| 5,080,198 | 1/1992 | Rice | 184/105.3 |
| 5,709,284 | 1/1998 | Shultz, Sr. | 184/5.1 |
| 5,782,318 | 7/1998 | Ng | 184/5.1 |

*Primary Examiner*—Tamara L. Graysay
*Assistant Examiner*—David M. Fenstermacher
*Attorney, Agent, or Firm*—Abelman, Frayne & Schwab

[57] ABSTRACT

A grease packer (10) for packing grease into a bearing (15) has an inner race and an outer race, having a non-rigid bearing holder (11) that defines a conical chamber (12) having a first open end (13) and a second open end (14) through which the bearing (15) may be loaded into the packer (10) with the outer race (16) sitting on the inner wall (17) of the conical chamber (12) and the bearing (16) spaced from the first open end. A non-rigid insert (20) has a first end defined by a stub (22) adapted to pass through the inner race (18) of the bearing (16) located in the conical chamber (12) and a conical outer surface (23) adapted to seat against the inner race (18) of the bearing (16). Grease applying means (38, 43) is connected to the bearing holder (11) to force grease through the first opening (13) of the bearing holder (11) and into the bearing (16) so as to pack the bearing (16) with grease.

13 Claims, 3 Drawing Sheets

BEARING GREASE PACKER

TECHNICAL FIELD

The present invention relates to a packer for packing grease into bearings, and more particularly to a hand operated tool that can use commercially available grease cartridges.

BACKGROUND ART

When maintenance is carried out on vehicles, machinery and the like, it is often the case that bearings need to be re-packed with grease to ensure efficient running of the bearing and to improve the service life of the bearing.

In the particular case of a sedan or station wagon, the bearings are of relatively small diameter and the usual way that the bearings are packed with grease is by tapping the bearing against the hand which has an amount of grease located thereon. This tapping is continued until the bearing is fully packed. In the case of larger motor vehicles such as multi-wheeled transport vehicles and heavy duty work vehicles, the bearings are of a much greater diameter and therefore a substantial amount of time would be required to pack the bearings with grease using this particular procedure.

The aforementioned procedure also has the difficulty that the bearings may not be packed to the desired extent and also to the fact that it is a recurring problem that dirt and other grit may not be able to be excluded from within the bearing. This is particularly the case where the hands of the person packing the bearing are often not completely clean prior to the commencement of the procedure.

Bearings may be packed using commercially available grease packers which operate using cones which screw together on a central thread and grease is then introduced to the bearing situated between the cones using a grease gun. This method has many features which are less than desirable such as:

(i) many other types of bearing packers use a hand grease gun to apply grease to the packing device, if a manual non-power assisted gun is used much effort and time is wasted as a grease gun is a low volume/high pressure device, (ii) the time taken to screw the cones together is a time consuming procedure, (iii) after a greasing operation, the device has many surfaces from which the grease must be removed, so as to keep the device clean, (iv) unless the whole device is kept under cover, dust and grit will enter the threads and surfaces of the cones, thereby causing contamination during the next greasing operation, (v) to initiate work, one must purchase both a grease gun and also a bearing packer adding to the cost.

Some other types of bearing packers, use a conical piston inside a blind ended cylinder, which prior to use, must first be loaded with grease using either a grease gun or a spatula to bring grease from a remote container. Again, there is unnecessary time inconvenience and the likelihood of dust/grit or foreign matter entering the bearing. With this style of packer it may not be possible to observe the bearing during packing operations, leading to under greasing or wasting of grease.

It is an object of the present invention to provide a device for packing grease into bearings which substantially overcomes or ameliorates the abovementioned disadvantages.

DISCLOSURE OF INVENTION

According to the invention there is provided a grease packer for packing grease into a bearing having an inner race and an outer race, said packer comprising:

(i) a non-rigid bearing holder defining a conical chamber having a first open end and a second open end through which the bearing may be loaded into the packer with the outer race sitting on the inner wall of the conical chamber and the bearing spaced from the first open end, (ii) a non-rigid insert having a first end defined by a stub adapted to pass through the inner race of a bearing located in the conical chamber and a conical outer surface adapted to seat against the inner race of the bearing located in the conical chamber, said insert having a second end, and (iii) grease applying means connectable to the bearing holder adapted to force grease through the first opening of the bearing holder and into the bearing so as to pack the bearing with grease.

MODES FOR CARRYING OUT THE INVENTION

Figure 1:
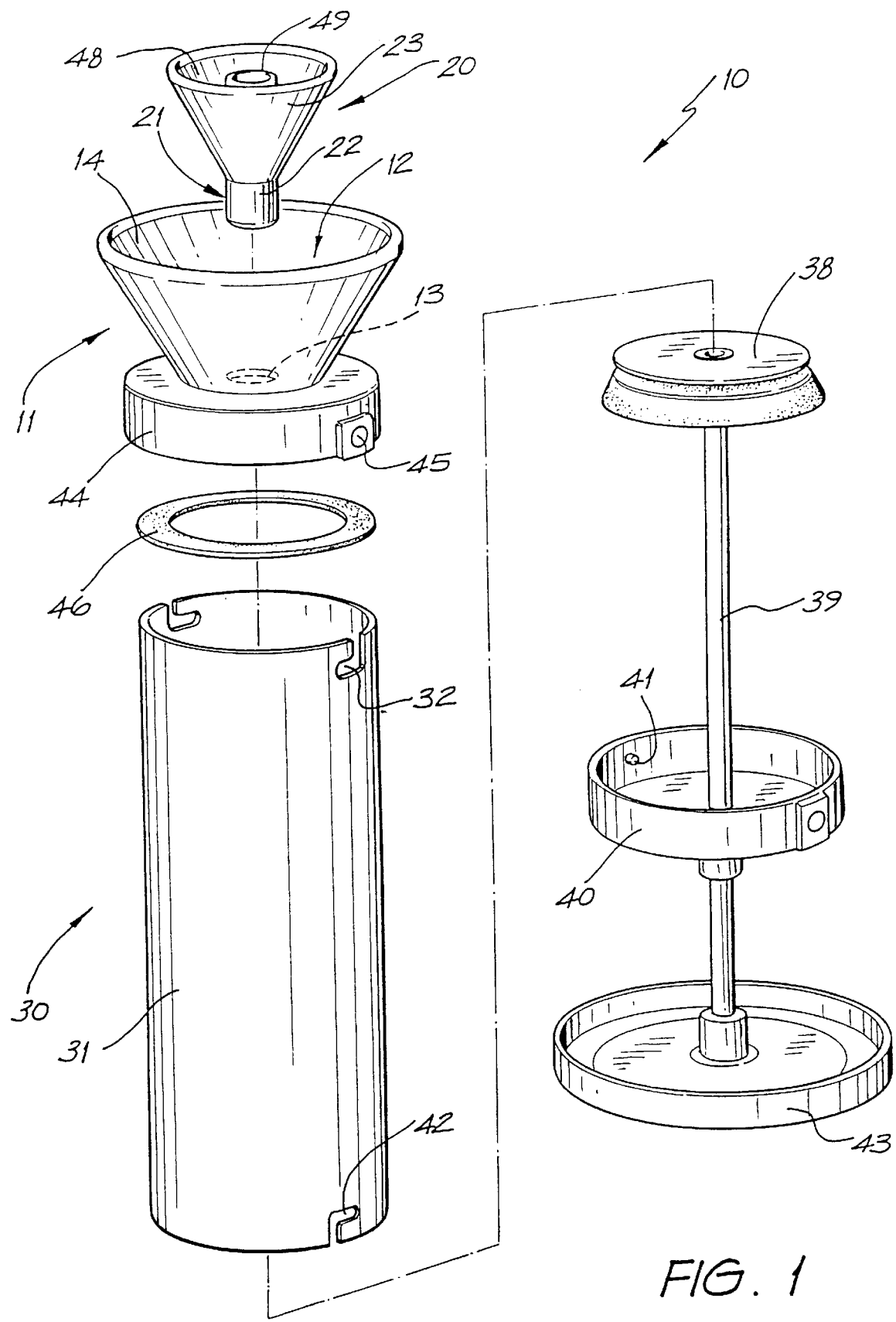
FIG. 1 is an exploded view of a grease packer according to one embodiment of the invention.
Figure 2:
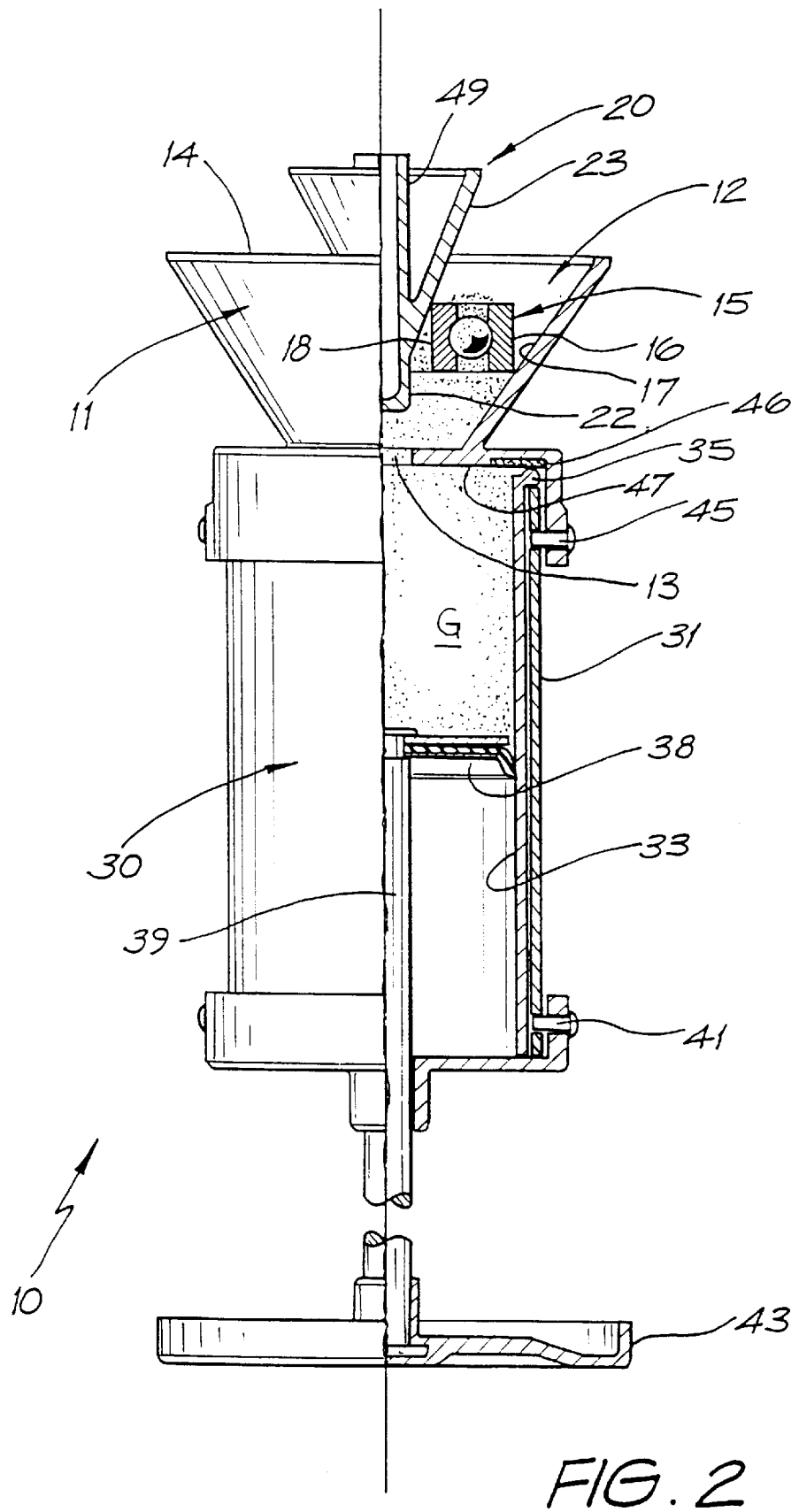
FIG. 2 is a cross-sectional view of the grease packer shown in FIG. 1.
Figure 3:
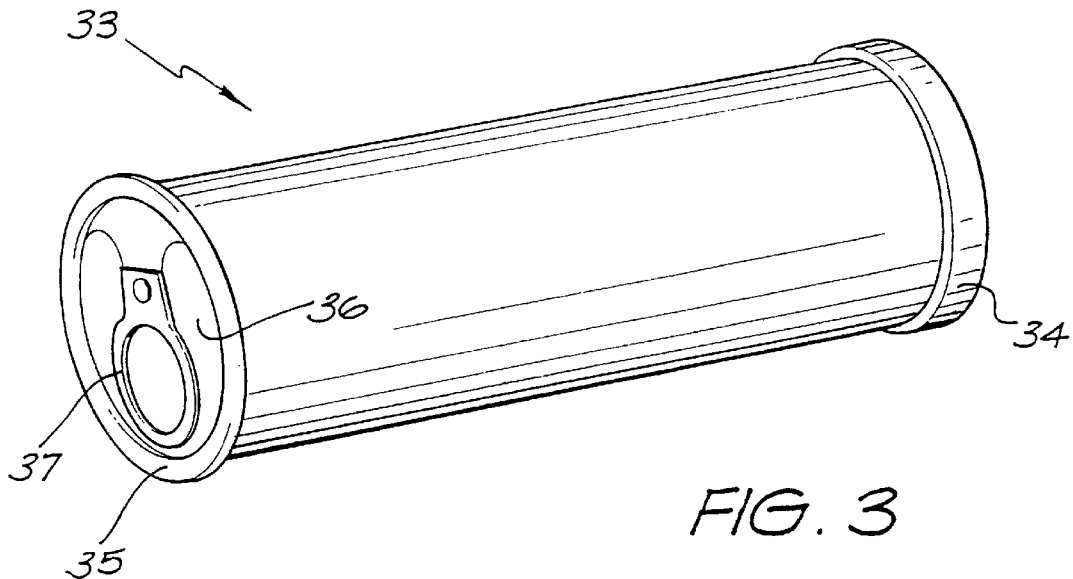
FIG. 3 is a perspective view of a grease cartridge for use with the packer of FIGS. 1 and 2.

The grease packer 10 shown in FIGS. 1 and 2 includes a non-rigid bearing holder 11 which defines a conical chamber 12 having a first open end 13 and a second open end 14 through which the bearing 15 is loaded so that its outer race 16 sits against the inner wall 17 of the conical chamber 12. As can be seen in FIG. 2, the bearing 15 is spaced from the first open end 13.

The packer 10 further includes a non-rigid insert 20 having a first end 21 defined by a stub 22 which is adapted to pass through the inner race 18 of the bearing 15. The insert 20 has a conical outer surface 23 adapted to seat against the inner race 18 of the bearing 15.

Grease applying means 30 includes a tubular housing 31 having upper and lower pairs of bayonet slots 32 and 42. A grease canister 33 having a removable cap 34 and a locating top rim 35 is located within the housing 31 and when so located, the top face 36 is removed by pulling the ring grip 37. A plunger 38 mounted on one end of a stem 39 is inserted into the open bottom of the canister 33.

The stem 39 is mounted on an end cap 40 which is releasably connected to the housing 31 by engagement of bayonet pins 41 with the slots 42 at the base of housing 31. Relative movement of the housing 31 and plunger 38 is achieved by downward movement of the packer 10 with the base means 48 fully supported.

The bearing holder 11 has a flange 44 around the first end 13 which is secured to the top of the housing 31 by engagement of bayonet pins 45 with the slots 32 at the top of the housing 31. A compressible gasket 46 is located in an annular recess formed in the lower face of the bottom wall 47 of the holder 11 to receive the rim 35 of the grease cartridge 33.

The conical outer surface 23 of the insert 20 defines a second open end 48 of the insert 20 in which is located gripping means 49.

In use, insert 20, is seated within the inner race 18 of bearing 16 (already located within bearing receiving chamber 12) so that a grease channel is defined between outer conical surface 23 of insert 20 and an inside conical surface 17 of holder 11.

Stub 22 at the apex of the insert 20 is so formed that it fits into open end 13 to prevent grease from exiting through open end 13 when the packer 10 is in storage. The stub 22 is also used to remove the bearing 16 from the packer 10 after greasing operations are complete.

It will be appreciated that the grease passage defined between conical surfaces 23 and 17 includes the bearing 16 such that when grease is forced from the cannister 33 it automatically passes through and only through the bearing 16. Whilst greasing operations are in progress and the bearing 16 is in place, the stub 22 will always be clear of open end 13 so as to allow grease to pass through open end 13 into the chamber 12.

The grease can be forced in this manner by use of the plunger 38 within grease cartridge 33 whereby grease in advance of the plunger 38 within the cartridge is forced through open end 13 and into the channel defined between outer conical surface 23 and inside conical surface 17.

Once grease has been added to the operator's requirements, downward pressure is relaxed and the insert 20 is tipped to one side so as to remove the bearing 16 from the holder 11. No grease need contaminate the operator's skin. There is no wastage of work clean up rags or paper towel and time is saved.

Once greasing is complete, the insert 20 is refitted to the holder 11 with stub 22 acting as a plug, keeping out dust and keeping out dirt and keeping the grease in the tube should the base means 43 be inadvertently pressed.

Storage is simply a matter of standing the packer 10 on a clean surface to prevent any dust entering between the holder 11 and insert 20 thereby ensuring readiness of device for instant service.

The packer is designed so that the need for a bearing to be loaded perfectly square into the grease packer to seal properly is done away with. As the holder 11 and insert 20 are made from a suitable flexible/elastic material that will return to its original shape in absence of pressure which causes distortion. The holder 11 and insert 20 will distort to the elliptical cross-section formed when a circular bearing is loaded into the packer out of square. In addition, the flexible holder 11 allows a perfect seal to be achieved with bearings that have damaged outer cases. The downward pressure exerted in operating the bearing packer is sufficient to seal the bearing and cones due to the cones flexible nature of the holder 11 and insert 20.

The prior art devices which use rigid cones require the bearing to be secured exactly square to both the outer cone and inner cone to seal the defined chamber required to force grease to flow through the bearing. The seal is maintained by pressure from a screw thread or the like. Any bearing not loaded perfectly square would form ellipses at the point of contact with the outer and inner cones and the bearing being circular would prevent a perfect seal and thus cause leakage.

The packer 10 of FIGS. 1 and 2 may not be suitable for larger bearings. Such larger bearings can be accommodated by the packer components shown in FIGS. 4 to 6. The design concept of this second embodiment of the invention is similar to that of the first embodiment except that the cone opening of the holder 11 is larger to accept the larger bearings and a round plate 81 (see FIG. 6) is used instead of the insert 20.

Figure 4:
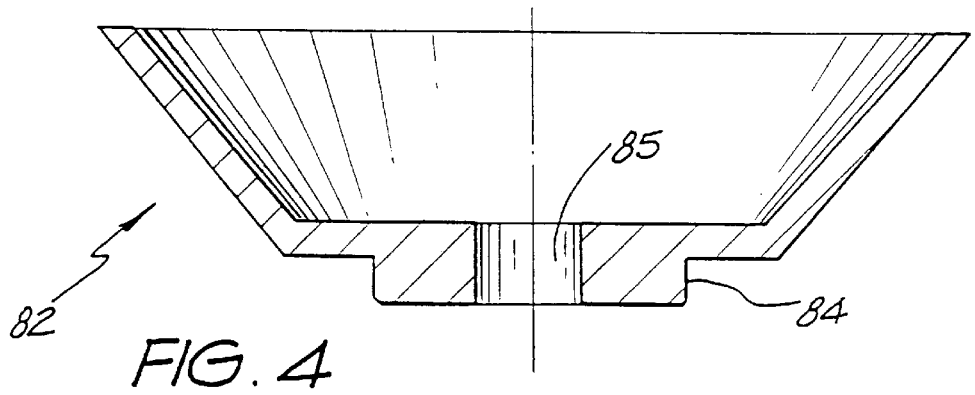
FIG. 4 is a cross-sectional view of a holder suitable for a larger size bearing.
Figure 5:
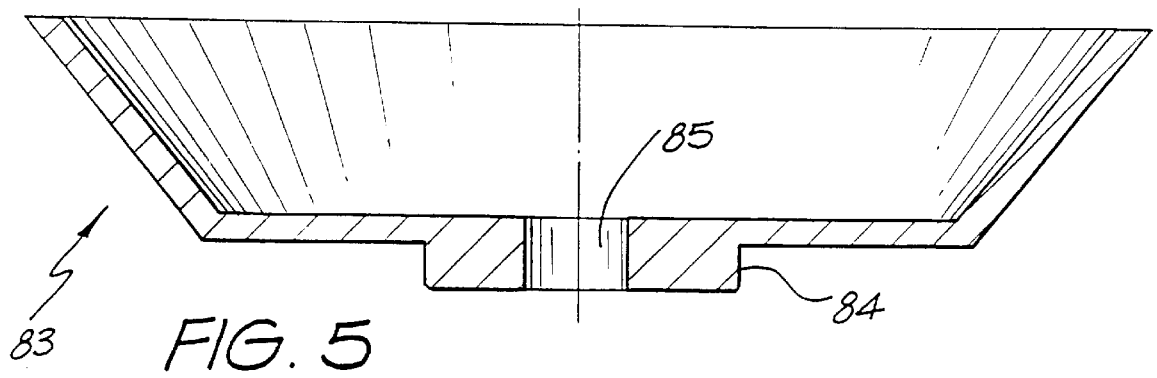
FIG. 5 is a cross-sectional view of a holder suitable for another larger size bearing.
Figure 6:
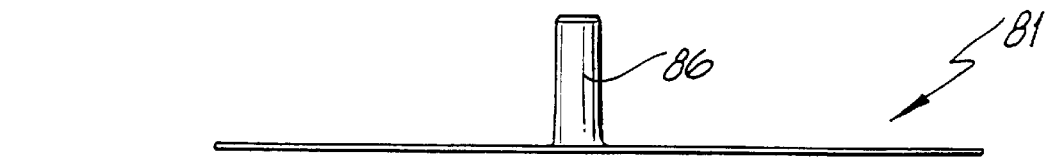
FIG. 6 is a cross-sectional view of an insert for a grease packer suitable for use with the packer guide of FIGS. 4 and 5.

The holders 82 and 83 shown in FIGS. 4 and 5 are each designed to accommodate larger bearings than the holder 11 of FIG. 1. Each holder 82 and 83 has a downwardly depending boss 84 which is fitted to the cartridge holder 31. A suitably sized plate 81 is placed in cone 82 or 83 with its stub or handle 86 away from cone opening 85. This size of the plate 81 is selected so that it covers the inside rim of the bearing without obstructing the bearing race.

The bearing to be greased is now placed into cone 82 or 83 on top of plate 81 which has been selected for correct size to match the inner bore of the bearing with some overlap. The handle 86 of the plate 81 protrudes through the center hole of the bearing. The operator applies pressure with both hands on the outer race of the bearing to press the outer rim against the wall of the holder 82 and 83 and to force grease from the cartridge into the cone 82 or 83 to contact the plate 81. Continued pressure forces the plate 81 against the inner race of the bearing to close the bore of the inner race to the exit of grease whereby grease can only flow into the bearing where it was intended.

When grease packing is complete, the bearing is lifted from the cone 82 or 83, plate 81 is wiped across the face of the cone to remove grease. The stub or handle 86 is provided on the plate 81 for this purpose to keep grease from the hands and skin. When the plate 85 is removed, it is placed handle-up on a clean surface. The cone and cartridge is placed cone face down on a clean surface.

It has been found that the use of the apparatus of the preferred embodiments has the following advantages:(i)

(i) no grease gun or spatula are required to load the device with grease, (ii) a standard off-the-shelf, commercially available grease cartridge is loaded into steel tube and speed turned onto the cone applicator, (iii) if no cartridge is available the steel tube can be loaded by conventional means. This is possible due to piston selected, and also surface finish inside the tube (i.e. cut weld fin), (iv) once the cartridge is loaded, the device is ready to use, (v) it is fully hand operated and no external power source is required, (vi) only clean pre-packaged grease is applied to bearing with no wastage, (vii) the method is quicker than prior art methods, (viii) it is very simple to use, reload and store.

The foregoing described only some embodiments of the present invention, and modifications obvious to those skilled in the art can be made thereto without departing from the scope and spirit of the present invention. For example, the packer could be made to operate in the reverse situation where the packer is positioned beneath the cannister.

I claim:

1. A grease packer for packing grease into a bearing having an inner race and an outer race, said packer comprising:

(i) a non-rigid bearing holder defining a conical chamber having a first open end and a second open end for loading the bearing into the packer with the outer race sitting on the inner wall of the conical chamber and the bearing spaced from the first open end, (ii) a non-rigid insert which is not mechanically affixed to the packer, the insert having a first end defined by a stub adapted to pass through the inner race of the bearing located in the conical chamber and a conical outer surface adapted to seat against the inner race of the bearing located in the conical chamber, said insert having a second end, and (iii) grease applying means connectable to the bearing holder adapted to force grease through the first opening of the bearing holder and into the bearing so as to pack the bearing with grease.

2. A grease packer according to claim 1 wherein the insert is polymeric and the conical outer surface of the insert defines a second, open end of the insert and there is provided a grip within the second, open end by which the insert may be moved into and out of the conical chamber.

3. A grease packer according to claim 1 wherein the stub of the insert is adapted to be inserted into and close the first open end of the bearing holder when there is no bearing in the conical chamber and wherein the grip is integral with the insert.

4. A grease packer according to claim 3 wherein the stub of the insert has a central grip, and wherein the insert is adapted to engage the inner race of the bearing when the insert is being removed from the chamber and away from the packer by using the grip.

5. A grease packer according to claim 1 wherein the grease applying means includes a tubular housing adapted to receive a grease cartridge, having a discharge opening in communication with the inlet to the conical chamber and plunger means adapted to force the grease from the cartridge through its discharge opening into the conical chamber.

6. A grease packer according to claim 5 wherein the bearing holder has flange means around the first open end, said flange means being adapted to be secured to the tubular housing.

7. A grease packer according to claim 6 wherein the flange means is connected to the tubular housing by a bayonet coupling.

8. A grease packer according to claim 7 and including compressible gasket means between the flange means and the grease cartridge.

9. A grease packer according to claim 5 wherein the plunger means includes a stem, an end cap through which the stem passes, a plunger on the inner end of the stem, base means on the other end of the stem and means for connecting the end cap to the tubular housing.

10. A grease packer according to claim 9 wherein the end cap is connected to the tubular housing by a bayonet coupling.

11. A grease packer according to claim 1 wherein the open end of the holder is located at the apex of the conical chamber.

12. A grease packer for packing grease into a bearing having an inner race and an outer race, said packer comprising:

(i) a non-rigid bearing holder defining a conical chamber having a first open end and a second open end through which the bearing may be loaded into the packer with the outer race sitting on the inner wall of the conical chamber and the bearing spaced from the first open end, (ii) a non-rigid insert having a stub adapted to pass through the inner race of a bearing located in the conical chamber and an outer surface adapted to seat against the inner race of the bearing located in the conical chamber so as to close off the boare of the bearing, and (iii) grease applying means connectable to the bearing holder adapted to force grease through the first opening of the bearing holder and into the bearing so as to pack the bearing with grease.

13. A grease packer for packing grease into a bearing having an inner race and an outer race, said packer comprising:

(i) a non-rigid bearing holder defining a conical chamber having a first open end and a second open end for loading the bearing into the packer with the outer race sitting on the inner wall of the conical chamber and the bearing spaced from the first open end, (ii) a plate means which is not mechanically affixed to the packer, the plate means having a first end defined by a stub adapted to pass through the inner race of the bearing located in the conical chamber and a conical outer surface adapted to seat against the inner race of the bearing located in the conical chamber, said plate means having a second end, and (iii) grease applying, means connectable to the bearing holder adapted to force grease through the first opening of the bearing holder and into the bearing so as to pack the bearing with grease.

* * * * *